United States Patent [19]

Bottali et al.

[11] 4,157,460

[45] Jun. 5, 1979

[54] APPARATUS FOR CUTTING AUDIO DISKS

[75] Inventors: Louis J. Bottali, Ridgefield, Conn.; Robert A. Finger, Yonkers, N.Y.; Daniel W. Gravereaux, New Canaan, Conn.

[73] Assignee: CBS Inc., New York, N.Y.

[21] Appl. No.: 835,604

[22] Filed: Sep. 22, 1977

[51] Int. Cl.$^2$ .............................................. G11B 3/78
[52] U.S. Cl. ..................... 179/100.4 C; 179/100.4 D
[58] Field of Search ............... 179/100.4 C, 100.4 ST, 179/100.4 D

[56] References Cited

U.S. PATENT DOCUMENTS

| | | | |
|---|---|---|---|
| 2,611,038 | 9/1952 | Graham | 179/100.4 C |
| 2,738,385 | 3/1956 | Bachman | 179/100.4 C |
| 2,792,454 | 5/1957 | Redlich | 179/100.4 C |
| 2,792,455 | 5/1957 | Redlich et al. | 179/100.4 C |
| 2,847,514 | 8/1958 | Evans | 179/100.4 C |
| 2,948,783 | 8/1960 | Scully | 179/100.4 C |
| 2,963,556 | 12/1960 | Redlich | 179/100.4 C |
| 3,075,052 | 1/1963 | Terry | 179/100.4 C |
| 3,223,789 | 12/1965 | Ooms | 179/100.4 C |
| 3,850,436 | 11/1974 | Rabe | 274/42 R |

Primary Examiner—Bernard Konick
Assistant Examiner—Donald McElheny, Jr.
Attorney, Agent, or Firm—Spencer E. Olson

[57] ABSTRACT

The disclosure applies to an audio recording apparatus which receives audio signals, generally from a tape recorder, and forms grooves in a spiral pattern on a recording disk. The apparatus typically includes a turntable for rotating the recording disk, a cutter for cutting grooves in the disk, and a cutter transducer for modulating the instantaneous position of the cutter as a function of the audio signals. An electromechanical subsystem is responsive to control signals for directing the unmodulated position of the cutter; i.e., its unmodulated radial position with respect to the center of the disk and its unmodulated vertical position or depth. In accordance with the invention, there is provided a system for automatically generating the control signals which control operation of the electromechanical subsystem. When no modification of the unmodulated radial position is called for, none is made, thereby eliminating wasteful pitch modifications.

29 Claims, 10 Drawing Figures

APPARATUS FOR CUTTING AUDIO DISKS

BACKGROUND OF THE INVENTION

This invention relates to audio recording and, more particularly, to an apparatus and method for controlling the cutting of audio-modulated grooves on a recording disk.

A record or phonograph disk contains audio information cut into grooves which begin at the outer edges of the record and spiral inward toward the center. Although really one continuous groove, most people refer to the surface as having many individual grooves, and this convention will be followed herein. A fixed amount of the record surface is available for the audio-modulated grooves. The surface, in the case of a conventional 33⅓ r.p.m. disk, is an annulus which extends from an outer diameter of 11½ inches to an inner diameter of 4¾ inches. When cutting the record, an audio signal, typically music originating from a tape recorder, modulates a cutter which, in turn, causes modulation in the position and depth of the groove that is cut by the cutter in a lacquer master. The groove can be modulated vertically (so-called hill and dale) or laterally, or a combination of both. For a conventional stereo record, left and right channel signals are respectively applied to cause modulation of orthogonal cutter surfaces which intersect the record surface at 45° angles, as will be illustrated below. This effectively causes both vertical and lateral modulation of the record groove in accordance with the difference and sum of the left and right channel signals.

Since the groove has a right-angle v-shaped cross section, the width of a groove is necessarily proportional to the depth of the groove. The groove width and the spacing between grooves determine the number of grooves which can be packed into the limited space on the record, and therefore determines the total playing time of the record. A greater degree of modulation, caused by louder signals, necessitates more modulation and wider grooves. To avoid cutting into an adjacent groove, provision must be made for increasing the intergroove distance (or "pitch") for louder signals to avoid having the modulation peaks of adjacent grooves cut into each other. However, a provision for sufficiently wide constant pitch was found to yield grooves which were too far apart during quieter passages, this being wasteful of record area and resulting in a shorter total recording time for music of a given loudness. (In this respect, it can be noted that since loud audio requires more "space" on the record, a good measure of the total information which can be packed onto the existing record space is the product of the total record playing time multiplied by a measure of the loudness of the music being recorded. Accordingly, it is generally an objective to maximize the "time-loudness product" of the record.).

To reduce the waste of record space which results from constant pitch, automatic variable-pitch control systems have been devised to automatically increase pitch during loud passages and return to a lesser pitch during quieter passages. While improvements in time-loudness product have resulted from these techniques, applicants have noted that substantial record space is still wasted by existing techniques and further improvement would be most desirable. Existing techniques of variable-pitch control also have drawbacks which could stand improvement. For exmple, existing systems generally have an "advance" tape head which provides audio from the previous revolution of the recording media. This technique requires control over a sizable portion of audio tape. Also, in prior art techniques, pitch variations called for by automatic pitch control systems may themselves introduce undesirable audio distortions.

A further important consideration in cutting a record is the depth of the grooves in th record. The groove can be visualized as having a steady-state or "unmodulated" depth upon which the audio modulations are superimposed. This means that a very large audio signal will result in extreme alternating deep and shallow groove depths. To prevent the shallow excursions from becoming less than an established minimum groove depth needed for proper playback tracking, one can increase the unmodulated depth of the cutter. However, a countervailing consideration is than an unnecessarily deep modulated groove depth will result in a waste of record space since, as noted above, the groove width is proportional to its depth.

A still further consideration in control of the record cutting process is the existence of "echo" which is the undesirable transfer of modulation as between adjacent grooves. Echo is caused by a deformation of the wall between adjacent grooves and can be suppressed by providing, under certain conditions, extra room or "land" between adjacent grooves. However, once again a countervailing consideration is that provision of at least a minimum "land" can tend to be wasteful of record space on those portions of the record where the minimum land is not necessary.

The prior art contains various teachings which address one or more of the stated requirements and problems, for example the U.S. Pat. Nos. 2,611,038; 2,738,385; 2,847,514; 2,948,783; 2,963,556; 3,075,052; 3,223,789 and 3,850,436. In some cases, the teachings of the prior art are found to provide inadequate solutions to the problems set forth. For example, solution may be suggested to one of the stated problems while compromising or ignoring other important considerations. To applicants' knowledge, no prior comprehensive technique has been devised which takes into account problems pertaining to pitch, depth control, echo, and introduction of distortion by cutter head motion, while also optimizing the time-loudness product of a produced record.

It is an object of the present invention to provide comprehensive solution to the prior art problems as set forth and to generally effect enhancement of the accuracy and efficiency of cutting audio disk recordings.

SUMMARY OF THE INVENTION

The present invention is applicable to an audio recording apparatus which receives audio signals, generally from a tape recorder, and forms grooves in a spiral pattern on a recording disk. The apparatus typically includes a turntable for rotating the recording disk, a cutter for cutting grooves in the disk, and a cutter transducer means for modulating the instantaneous position of the cutter as a function of the audio signals. An electromechanical subsystem is responsive to control signals for directing the unmodulated position of the cutter; i.e., its unmodulated radial position with respect to the center of the disk and its unmodulated vertical position or depth. In accordance with the invention, there is provided a system for automatically generating the control signals which control operation of the electromechanical subsystem. Means are provided for sampling the audio signals a predetermined time before they are applied to the cutter transducer. This is preferably, although not necessarily, done using a preview head on the tape recorder. The predetermined time is preferably a small fraction of the time of one full revolution of the disk, but is sufficient to allow smooth transitions of the unmodulated position of the cutter to be implemented in a manner which does not introduce abrupt distortion-causing motions of the cutter in sufficient time for the position modification to be implemented before the audio signals (which give rise to the need for the modification) arrive at the cutter transducer. Means are provided for storing the sample values, and further means are provided for determining and storing the unmodulated position of the cutter. As will become understood, since modifications of the unmodulated position of the cutter result from application of precise control signals, the current unmodulated position thereof can be constantly monitored by keeping track of the control signals. In accordance with an important feature of the invention, means responsive to current sample values, to the unmodulated position of the cutter, and to the prior sample values stored when the recording disk was at the same azimuthal position during cutting of the previous groove, are provided for computing a cutter unmodulated position to be implemented when the audio signals are applied to the cutter transducer means after the predetermined time. In particular, the cutter unmodulated radial position necessary to avoid overcutting the previous groove is computed. Then, means responsive to the current unmodulated radial position of the cutter and the computed necessary unmodulated radial position of the cutter are provided for generating control signals to modify the unmodulated radial position of the cutter only when its current unmodulated position is insufficient to avoid overcutting. Thus, when no modification of the unmodulated radial position is called for, none is made, thereby eliminating wasteful pitch modifications which characterize systems that employ a basic minimum pitch variation.

In the preferred embodiment of the invention, means are also provided for computing the cutter unmodulated depth necessary to avoid a groove depth that is shallower than a predetermined minimum groove depth. Means responsive to the current unmodulated cutter depth and the computed necessary unmodulated cutter depth are provided for generating control signals to modify the unmodulated depth of the cutter when its current unmodulated depth is insufficient to avoid cutting a groove that is too shallow. In this embodiment, the control signals are applied to the electromechanical subsystem via at least one smoothing filter which prevents distortion-introducing abrupt changes of the cutter unmodulated position.

In the preferred embodiment of the invention there are also provided means responsive to current sample values and to prior sample values stored when the disk was at the same azimuthal position during cutting of the previous groove for computing the radial land distance between grooves necessary to suppress echo as between the adjacent grooves. In this embodiment, the means for computing the cutter unmoduated radial position is also responsive to this computed radial land distance.

Further features and advantages of the invention will become more readily apparent from the following detailed description when taken in conjunction with the accompanying drawings.

DESCRIPTION OF THE PREFERRED EMBODIMENT

Figure 1:
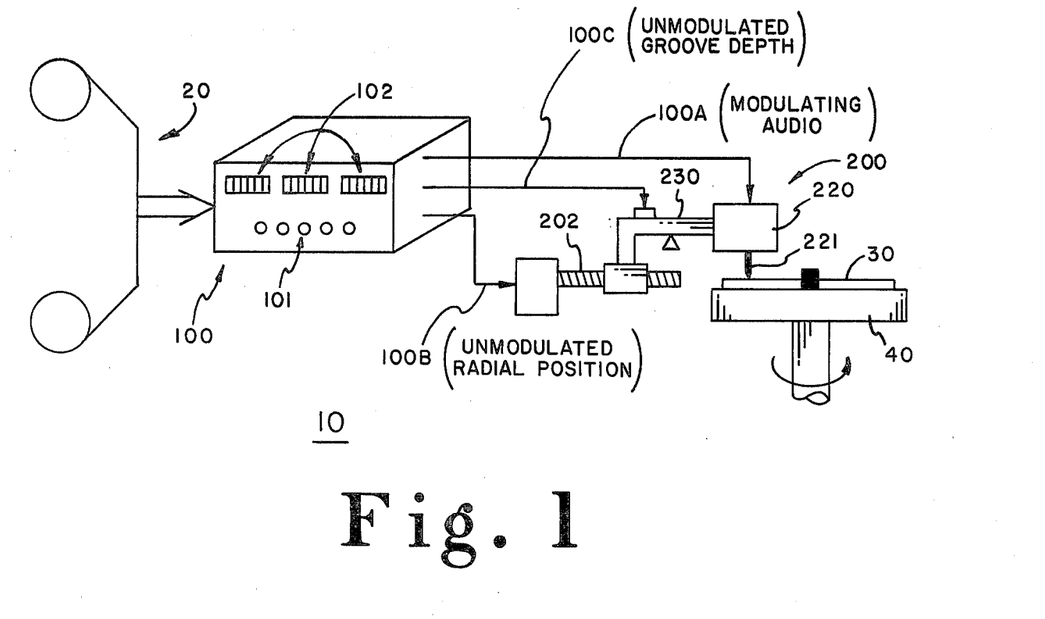
FIG. 1 is a simplified diagram of an audio recording system in accordance with the invention.

Referring to FIG. 1, there is shown a sound recording system 10 in accordance with an embodiment of the invention. An intermediate sound recording source, such as magnetic tape recorder 20, has mounted thereon a magnetic tape which contains the audio information that is to be eventually recorded on a disk medium 30. The output signals from the tape recorder 20 may be in any suitable form, such as monophonic, stereophonic, or quadraphonic, but for purposes of illustration herein will be assumed to be in stereophonic form. The outputs of tape recorder 20 are coupled to a console 100 which contains, inter alia, control circuitry in accordance with the invention, operator input controls 101, and displays 102 which display various parameters concerning the recording process. Output signals from the console 100 are coupled to a recording lathe subsystem 200 which includes a cutter head 220 mounted on a movable lathe carriage 230. The cutter head 220 has a wedge-shaped cutter stylus 221 which cuts grooves in the recording disk 30. The cutter stylus motion is modulated by a cutter transducer in cutter head 220 which, in turn, is modulated by the audio signals from recorder 20. The modulating audio signals are illustrated as being coupled through the console 100 and are represented by the output signals 100A from console 100. The recording disk 30, which is typically a lacquer disk, is mounted on a turntable 40 that is rotated by suitable motive means (not shown). After the audio information has been cut into the disk 30, the disk is utilized to make masters from which metal stampers are ultimately manufactured. Phonograph records can then be stamped out in large quantity, as is well known in the art.

As stated, the instantaneous audio modulation is applied to the cutter as signals 100A. For stereophonic audio, this signal would modulate both the vertical and the lateral instantaneous cutter position, the vertical modulation being a function of the difference between the left and right audio signals and the lateral modulation being a function of the sum of the left and right audio signals. In addition to being modulated by the instantaneous audio signals, the cutter is also moved radially inward toward the center of the disk at a relatively slow rate in order to obtain the spiral of grooves. To achieve this, the cutter head 220 is mounted on a movable carriage 230 whose position is determined by rotation of a lead screw 202. Rotation of the lead screw 202 is under control of signals 100B from the console 100, the generation of control signals in accordance with the principles of the invention to be described in further detail hereinbelow. Also, in accordance with the invention, the unmodulated vertical position or depth of the cutter is controlled by signals 100C from the console 100. (As used herein, the "unmodulated" position of the cutter is intended to mean its steady state position upon which the instantaneous audio modulations are superimposed; i.e., the position it has in the absence of audio modulation.) The manner in which the control signals 100C are generated is also treated in detail hereinbelow. Briefly, however, the signals 100C provide "deepening" of the cutter, when necessary, in order to prevent the occurrence of a groove which is too shallow and which could, for example, cause a stylus playing an ultimately produced phonograph record to ride out of the groove.

Figure 2:
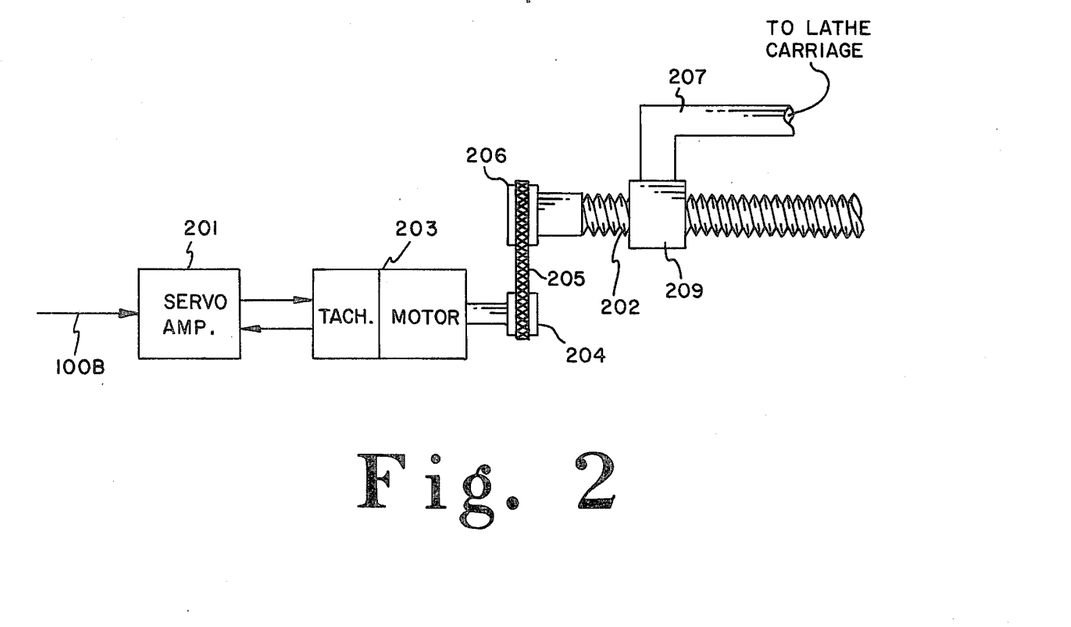
FIG. 2 illustrates a portion of the recording lathe subsystem of FIG. 1 which is utilized to implement cutter pitch modifications.

FIG. 2 illustrates a portion of the recording lathe subsystem 200 which is used to control the unmodulated radial position of the cutter. The control signal 100B from console 100 is coupled to servoamplifier 201 which is, in turn, coupled, in a feedback arrangement, to DC motor/tachometer combination 203. The motor shaft has a relatively small pulley 204 mounted thereon, and a belt 205 causes a larger pulley 206 to be driven by the smaller pulley 204. Coupled to the pulley 206 is the lead screw 202 which serves as a worm gear and, upon rotation, moves a split nut 209 slowly to the right. An arm and bar 207 are coupled to the split nut and the bar is coupled to lathe carriage 230 which carries the cutter head 220. In operation, the motor turns only when a control signal 100B is present, so that the cutter head is radially stationary in the absence of a control signal. The presence of a control signal causes rotation of the motor shaft as a function of the magnitude of the control signal. As a result, the lead screw is rotated, thereby causing the cutter head 220 to move radially inward toward the center of disc 30.

Figure 3:
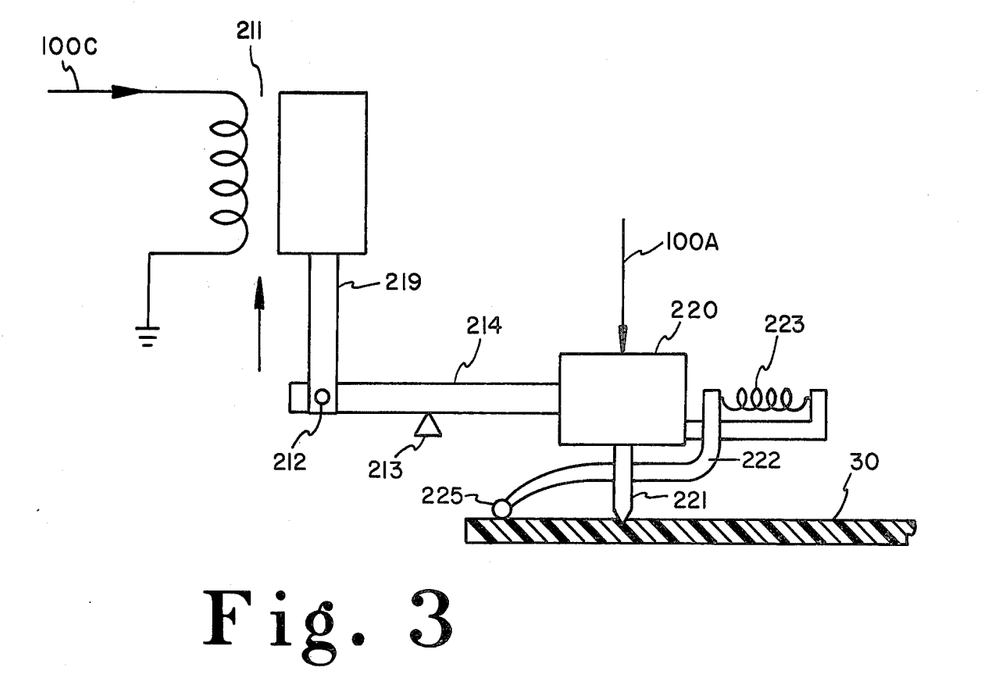
FIG. 3 illustrates another portion of the recording lathe subsystem of FIG. 1 which is utilized to implement unmodulated depth control over the cutter.

In FIG. 3 there is illustrated the portion of the recording lathe assembly 200 which controls the unmodulated depth of the cutter 221. The control signal 100C is in the form of a current level applied to the winding of a solenoid 211. The greater the control current, the greater is the force the solenoid 211 exerts on an arm 219 (in an upward direction in FIG. 3). This causes the level 214, which is mounted on pivot 213, to push the cutter head 220 downward, thereby causing a deepening of the unmodulated depth of the groove cut by cutter 221. An advance ball assembly, including advance ball 225 mounted on arm 222 which is spring mounted to cutter head 220, may also be provided, as is known in the art. As will be described further hereinbelow, during the cutting of the record, at least a minimum current 100C is continuously present so as to maintain at least a minimum unmodulated groove depth. During operation, increases or decreases in the control current 100C are used to effect temporary increases or decreases in the unmodulated groove depth.

Figure 4:
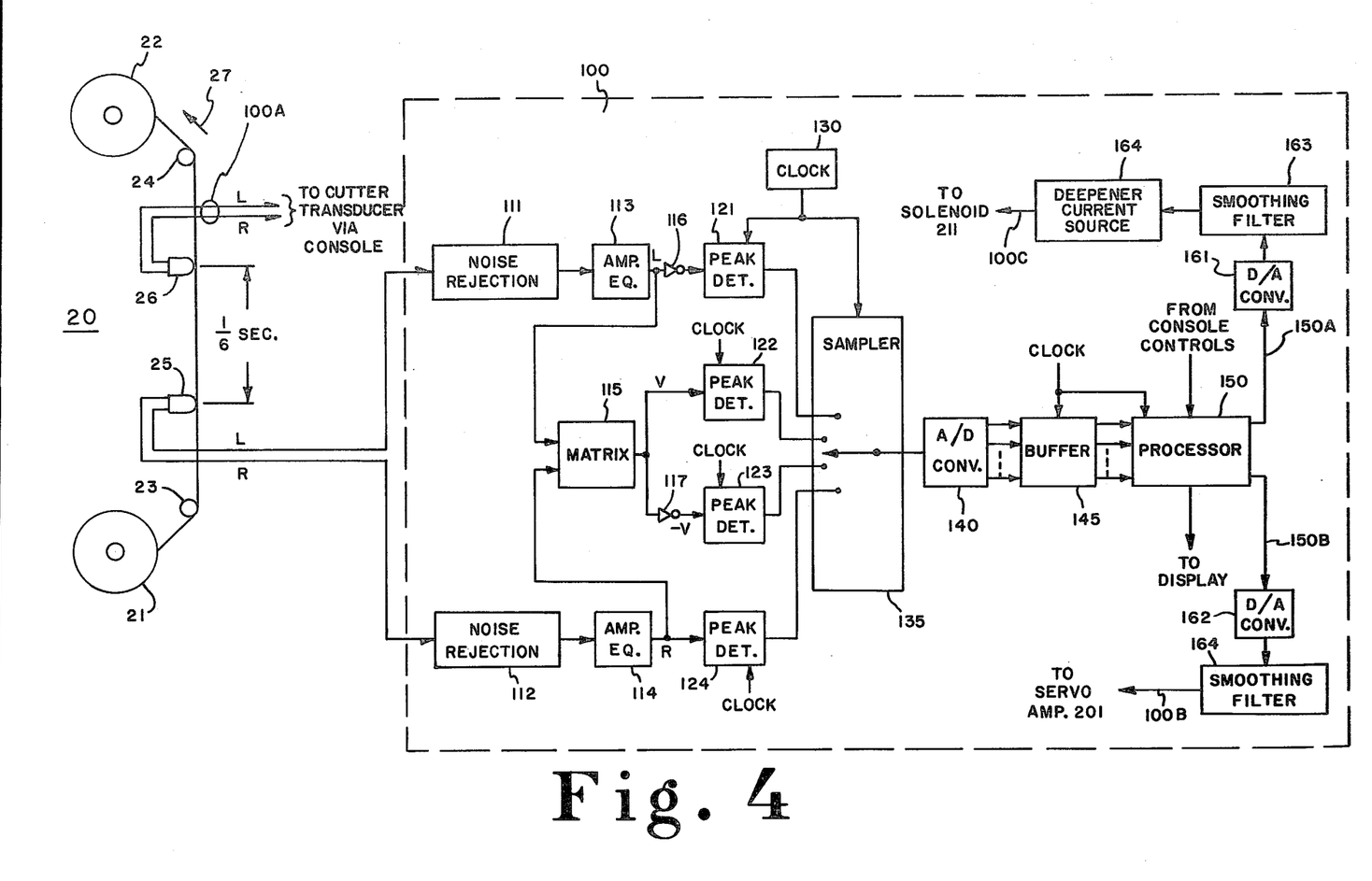
FIG. 4 is a block diagram of a control apparatus in accordance with the invention, shown in conjunction with an audio tape recorder having a preview head.

Referring to FIG. 4, there is shown a block diagram of portions of the recording system 10, the circuitry shown in the dashed enclosure preferably being included within the console 100. Audio tape recorder 20 is illustrated as including supply reels 21, takeup reel 22, rollers 23 and 24, and dual pickup heads 25 and 26. The tape advances in the direction indicated by arrow 27, and the heads 25 and 26 are precisely positioned such that the head 25 picks up the audio signals 1/6 second before they are picked up at the head 26. As will become understood, the head 25 provides a "preview" of the signal which will be applied to the cutter 1/6 second later and is utilized so that appropriate changes in the unmodulated vertical and lateral positions of the cutter can be initiated in advance of when they are needed, since it is desirable to effect these changes smoothly and without abrupt motion. Any suitably short period of time could be used instead of 1/6 second, but it will be understood that this preview time is not comparable to (and is about an order of magnitude less than) a "previous revolution" preview signal that is utilized in prior art automatic pitch control systems. In these prior systems, a preview head examines the audio to be applied to the subsequent groove (which is audio that will occur 1.8 seconds later for a $33\frac{1}{3}$ r.p.m. recording) in order to adjust inter-groove pitch to avoid overcutting. As will become clear, this relatively long tape recorder preview, and problems associated therewith, are not necessary in the present invention.

The signals from head 26, representative of left (L) and right (R) audio are applied, typically although not necessarily via console 100, to the cutter transducer (signals 100A). The preview versions of the L and R audio are respectively applied to common mode noise rejection circuits 111 and 112 and then to amplitude equalization circuits 113 and 114. These circuits are known in the art, and do not constitute novel portions of the present invention, so they will not be described further. The output of amplitude equalization circuits 113 and 114 are coupled to a matrix 115 which generates signals representative of vertical modulations that are conveniently a function of L and R. Specifically, the vertical signal is derived as $V=0.707(L-R)$. The output of the matrix 115 is a signal designated $+V$. The matrix output is inverted by the inverting amplifier 111, and is designated $-V$. The left amplitude equalizer signal is also applied to an inverting amplifier (116), whose output is designated $-L$. The output of right amplitude equalizer 117 is not inverted and is designated $+R$. These four signals, $-L$, $V$, $-V$, and $R$, are respectively coupled to peak detectors 121, 122, 123 and 124. In the present embodiment, the peak detectors are operative to detect the greatest positive peak of their respective signal during a 9 millisecond sampling period. The sampling period is defined by a clock 130 which produces clock pulses every 9 milliseconds. Specifically, peak detector 121 produces an output representative of the negative peak of the signal L (i.e. the positive peak of inverted L) which is designated $L-$. Peak detector 122 produces an output representative of the positive peak of the signal V, which is designated $V+$. Peak detector 123 produces an output representative of the negative peak of the signal V (i.e. the positive peak of inverted V), which is designated $V-$. Peak detector 124 produces an output which is representative of the positive peak of the signal R, which is designated R+. A sampler 135 also operates under control of clock 130. At the end of each 9 millisecond sampling period, sampler 135 sequentially samples the signals on the four outputs of the peak detectors, this sampling being performed at a higher rate, for example in 20 microseconds. The end of a 9 millisecond sampling interval also causes the peak detectors to be reset to begin looking for new peak values.

The output of sampler 35 is coupled to an analog-to-digital converter 140 which, in the present embodiment, converts each sample signal to an eight-bit digital word. The eight bits of each digital word are coupled in parallel to a buffer 145 which also receives the 9 millisecond clock pulses from clock 130 and timing pulses from a processor 150. Thus the buffer 140, after each clock pulse, receives a group of four eight-bit digital words which represent the peak amplitudes of the L−, R+, V+, and V− signals during the previous 9 millisecond sampling period.

The processor 150 may be any suitable computing unit, for example a minicomputer, microprocessor, or hard wired logic circuitry having a memory capability. For example, a digital processor such as the Pro-Log Company microprocessor, model PLS-400, using INTEL model 4004 integrated circuits, may be employed. The manner in which the processor 150 is programmed and controlled will be described further hereinbelow. For the present, it suffices to note that the processor 150, in addition to receiving four data words from buffer 145 each 9 millisecond sampling period, also can receive manual control inputs from the console 100. Regarding outputs of the processor 150, digital signals are generated which control the displays 102 of the console 100, and are used to produce analog signals which control operation of the recording lathe subsystem 200 of FIG. 1. In particular, digital output signals designated 150A and 150B from processor 150 are coupled to digital-to-analog converters 161 and 162 respectively. The signal 150A ultimately controls the unmodulated vertical position (depth) of the cutter 221 and the signal 150B ultimately controls the unmodulated horizontal (radial) position of the cutter. The D/A converters 161 and 162 convert the digital signals to analog signals which are respectively applied to smoothing filters 163 and 164. The filters may be, for example, 6-pole low pass Bessel-type filters. The output of filter 163 is coupled to deepener current source 164 which produces the control signal 100C that controls depth control solenoid 211 (FIG. 3). The output of filter 164 is the control signal 100B which is coupled to servo amplifier 201 (FIG. 2). As previously noted, the smoothing filters have response characteristics selected, in conjunction with the electromechanical elements under control, so that the results of a command from the processor 100 are implemented with predetermined motion within 1/6 second after the command. This is compatible with the control signals being derived from audio obtained at the preview head 25 which is 1/6 second ahead of the modulating audio signals applied to the cutter transducer.

Figure 5:
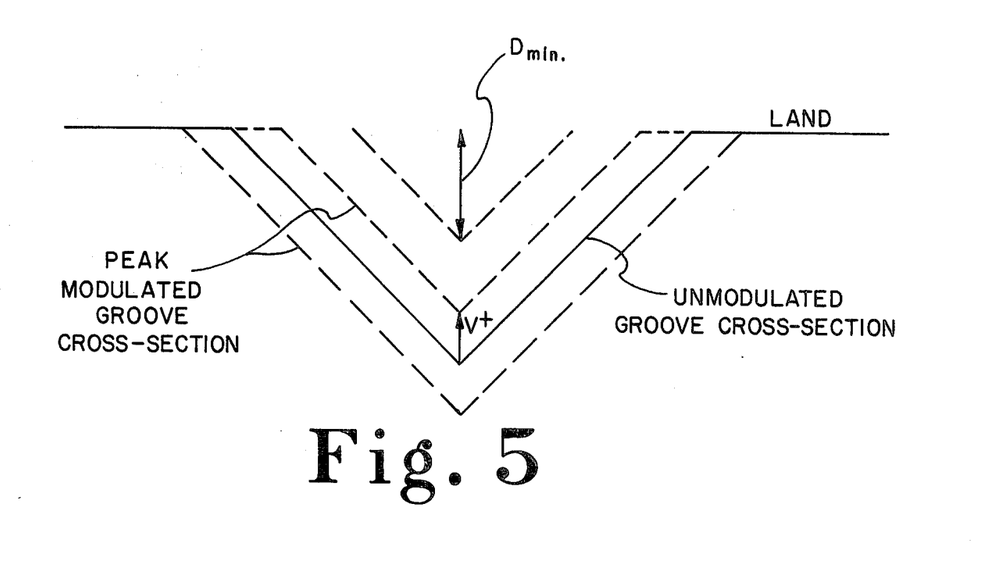
FIG. 5 is a simplified cross section through a record groove which is helpful in illustrating considerations of control over unmodulated groove depth.
Figure 6:
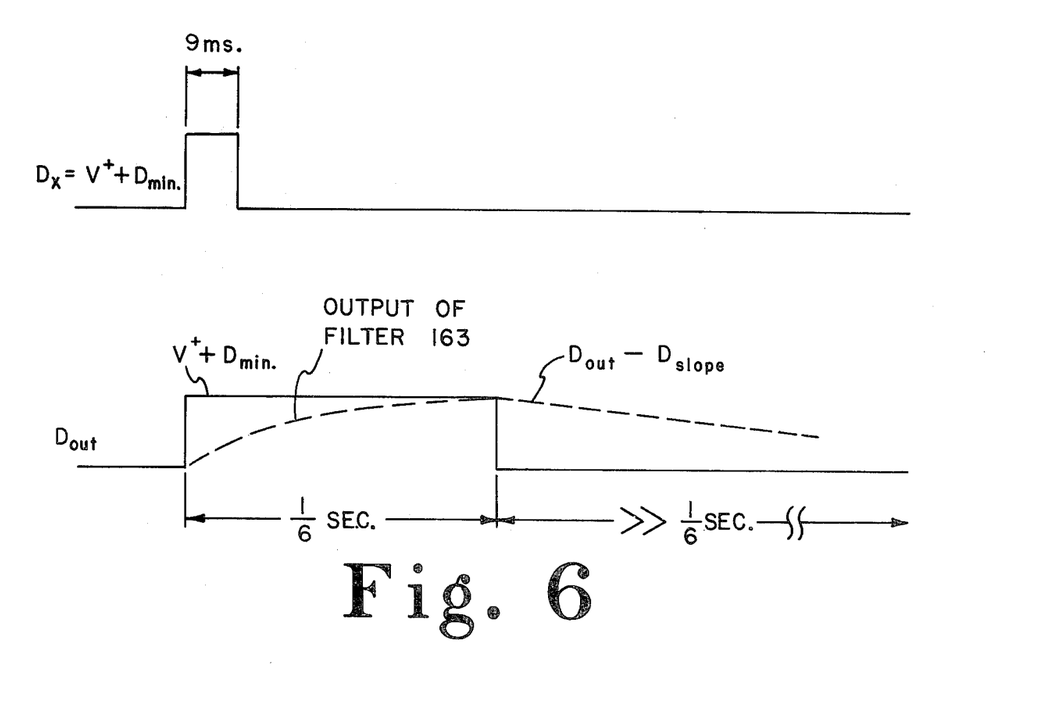
FIG. 6 illustrates the manner in which the unmodulated groove depth controlling signal is generated.
Figure 7:
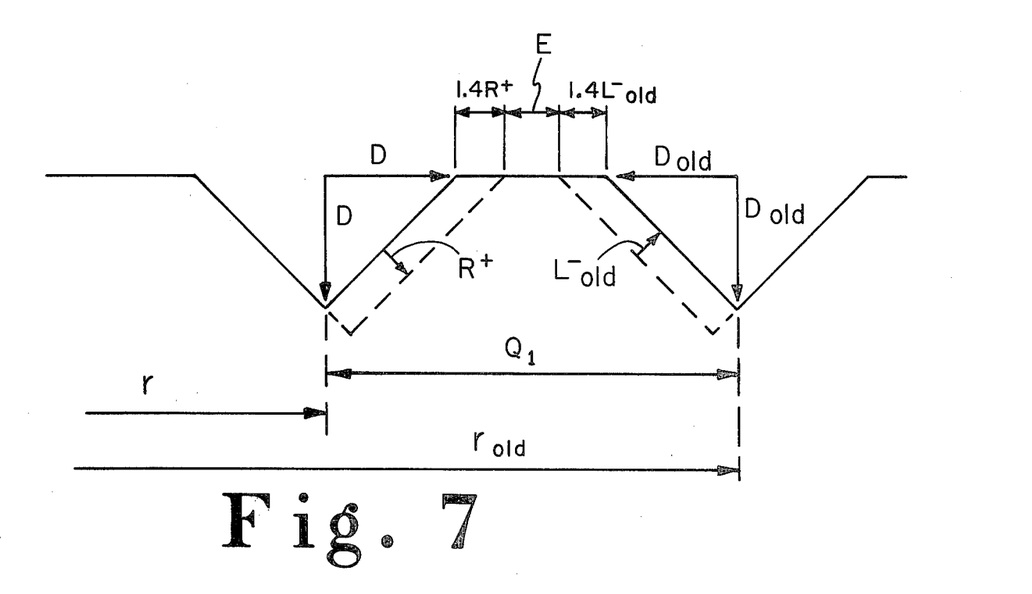
FIG. 7 is a cross section through a pair of adjacent grooves which is useful in understanding considerations of inter-groove pitch.

Before describing the programming of the processor 150 of FIG. 4, it is helpful to describe some of the underlying theory upon which generation of the control signals is based, and this is done in conjunction with FIGS. 5, 6 and 7. In FIG. 5, there is shown an enlarged cross section through a groove formed by the cutter 221 of FIG. 1 or FIG. 3. As is conventional, the cutter stylus is substantially a right angle wedge and forms a v-shaped groove which is twice as wide as it is deep. The solid line in FIG. 5 represents the unmodulated groove cross section at a depth which results from the vertical reference position of the cutter, as determined from the control signal 100C applied to the depth control solenoid 211 of FIG. 3. In other words, the solid line represents the groove cross section for a particular cutter depth setting, about which modulations (caused by the audio signals) will take place. Typically, an operator will select a standard or basic unmodulated groove depth, designated $D_{base}$, which is manually input to the console 100 of FIG. 1 (for example, via one of the control knobs 101). This value may be selected, for example, as 1.1 mils and represents a sufficient depth for audio signals of average level, with provision being made for deepening when necessary, as will be described directly. The illustrated dashed lines represent the peak modulated (minimum and maximum) groove cross section for a vertical audio signal of a particular amplitude. As previously noted, it is desirable to insure that at least a certain minimum groove depth is maintained in order to prevent a stylus from riding out of the groove of an ultimately produced disk recording. This minimum groove depth is designated as $D_{min}$ and may also be input by an operator prior to cutting the recording. A typical value for $D_{min}$ is 0.7 mils.

A danger of the groove depth being less than $D_{min}$ occurs when the amplitude of the modulating audio is sufficiently great that the peak upward vertical modulation (V+ in FIG. 5) superimposed on the unmodulated groove depth ($D_{base}$ for the normal condition) causes a groove depth less than $D_{min}$; that is, $(D_{base} - V+) < D_{min}$. When this condition is found to occur the unmodulated groove depth, designated $D_{out}$, must be "deepened" to a degree which insures that the minimum groove depth requirement will not be violated; i.e. so that $D_{out} = V^{30} + D_{min}$. If, however, the minimum groove requirement is not violated, the unmodulated groove depth can be set at $D_{base}$. Summarizing, if the present unmodulated groove depth is designated as "prev $D_{out}$", the "rules" for "deepening" are as follows:

If (prev $D_{out} - V+) < D_{min}$, then set
$D_{out} = V+ + D_{min}$               (1)

If (prev $D_{out} - V+) \geq D_{min}$, then set $D_{out} = D_{base}$     (2)

Referring to FIG. 7, there is shown a cross section through a pair of adjacent grooves of a disk recording, the cross section having been taken radially through the disk so that both grooves are at the same azimuthal reference. Two considerations can be conveniently described using this diagram; viz., the amount of "land", designated as E, necessary to prevent echo as between the audio signals on adjacent groove walls, and the distance $Q_1$ between groove centers necessary to prevent overcutting as between adjacent groove walls. In FIG. 7, the center of the disk recording is considered as being to the left, so the left groove is designated as the "new" groove and the right groove is designated as the "old" groove (since, during cutting, the cutter proceeds toward the center of the record, so the left groove can be considered as the one presently being cut). The unmodulated radii of the new and old grooves are respectively designated as r and $r_{old}$, with the difference between r and $r_{old}$ being $Q_1$; i.e., $Q_1 = r_{old} - r$. The unmodulated depth of the new and old grooves are respectively designated as D and $D_{old}$. The modulation into the right-hand wall of the new groove, in the direction indicated by the arrow, is designated as $R^+$, and the modulation into the left-hand wall of the old groove, in the direction of the arrow, is designated as $L_{old}^-$. These distances will be understood to be a function of the positive peak of the right audio signal which modulates the new groove and the negative peak of the left audio signal which modulates the old groove. The respective distances from the edge of the unmodulated grooves to the right and left modulated groove positions (indicated by dashed lines) are respectively 1.4 $R^+$ and 1.4 $L_{old}^-$. This follows directly from the geometrical consideration that a right angle cutting edge is employed so that the groove makes a 45° angle with the surface of the disk. The distance $Q_1$ can now be readily computed as the sum of distances between r and $r_{old}$ (bearing in mind that the radial distance from the unmodulated groove center to the unmodulated groove wall is equal to the unmodulated groove depth—as shown by the arrows—due to the 45° right triangle relationship) as follows:

$$Q_1 = D + 1.4R^+ + E + 1.4L_{old}^- + D_{old} \tag{3}$$

Therefore, $Q_1$ is seen to be the distance required between unmodulated groove centers which avoids overcutting for the parameters set forth; i.e., a new unmodulated groove depth of D, a right audio peak of $R^+$, an echo-preventing land distance of E, an "old" (from the previous groove) left audio negative peak of $L_{old}^-$, and an "old" unmodulated groove depth of $D_{old}$. The present distance as between unmodulated groove centers is designated "P" (in the absence of a pitch modification, which is to be made only if necessary, in accordance with a feature of the invention). One can now compute the difference, designated $\Delta R$, between the required pitch (i.e. the required distance between unmodulated groove centers), $Q_1$, and the present pitch, P, as:

$$\Delta R = Q_1 - P \tag{4}$$

Thus, in accordance with a feature of the invention, if $\Delta R$ is equal to or less than 0, no pitch modification is needed or made, but if $\Delta R$ is greater than 0, a pitch increase by the amount $\Delta R$ is implemented so that overcutting is avoided. It should be borne in mind that calculations are performed 1/6 second in advance of the audio being recorded, so that when a pitch modification is deemed necessary, there is a 1/6 second time in which it can be mechanically implemented in a smooth manner which avoids any abrupt cutter motion that might be audible during playback on an ultimate recording.

The distance between adjacent modulated groove edges, designated as the "land" E, is determined as a function of the potential inter-groove echo. The echo resulting from a difference in audio signal level as between adjacent grooves can be expressed as:

$$\text{Echo} \sim |\log V^- - \log V_{old}^-| \tag{5}$$

that is, the absolute value of the difference between the logs (for example, to the base 10) of the adjacent maximum groove vertical downward modulation. In the present invention the amount of land between grooves is increased when Echo is large and decreased when Echo is small. In particular, the "land" E then is determined as a function of Echo from (5) above; i.e., $$E = f(\text{Echo}) \tag{6}$$

E can be selected, for example, as being a linear junction of Echo, such as $E = K \cdot \text{Echo}$ where K is selected by the operator, typically in accordance with the type of music beig recorded. For example, K may be selected as having a higher value in the case of classical music where echo may be considered more noticeable and undesirable than in the case of, say, rock music.

Figure 8:
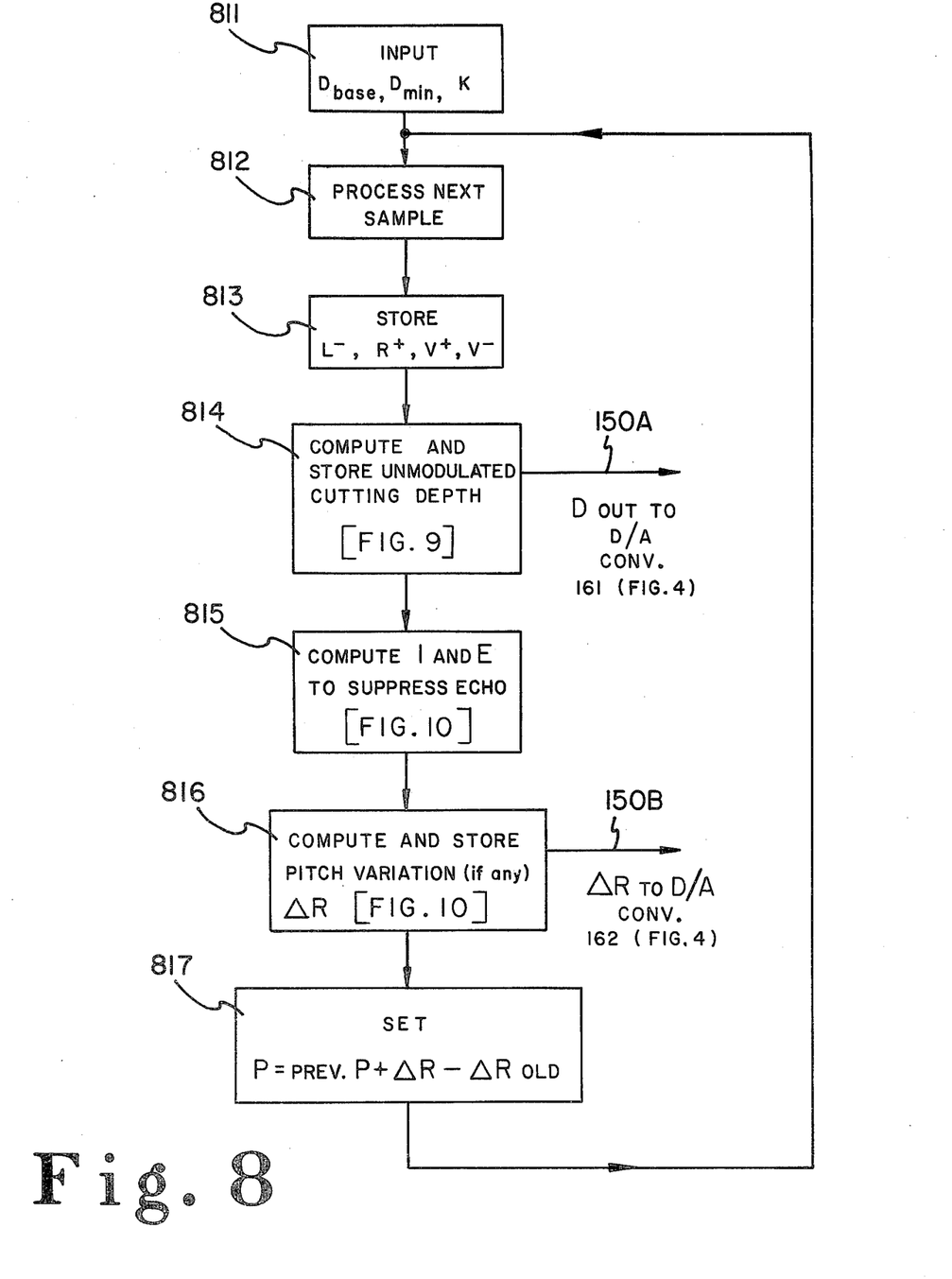
FIG. 8 is an operational flow chart which, when taken in conjunction with the flow charts that are referenced therein, is suitable for programming the processor of FIG. 4 to implement an embodiment of the invention.

Referring to FIG. 8, there is shown a basic operational flow chart which, when taken in conjunction with the flow charts that are referenced therein, is suitable for programming the processor 150 to implement an embodiment of the invention. Block 811 represents the initial selection of values by an operator, these values typically being input via the control knobs 101 of console 100 in FIG. 1. For example, an operator may initially select a standard unmodulated groove depth $D_{base}$ of 1.1 mils, a minimum groove depth during modulation of $D_{min}$ of 0.7 mils, and an echo-prevention "land" determining constant K which is suitable for the type of music to be recorded. The operator may also typically input audio level controls and input control parameters pertaining to "lead in" and "leadout" which determine the nature of the grooves on the record before and after the audio portion thereof. These latter techniques are known in the art, can be implemented either manually or automatically, and do not constitute part of the present invention; so they will not be described in detail herein.

The block 812 is next entered, this block merely representing that the next sample of information is to be processed, namely the next group of four 8 bit words representative of the peak audio information during the most recent 9 millisecond sampling period taken at the preview head 25 as described above. Block 813 is next entered, this block representing the storage of the values $L^-$, $R^+$, $V^+$, and $V^-$ associated with this sample, these signals having been coupled to processor 150 via buffer 145 of FIG. 4. The block 814 is then entered, this block representing the computation and storage of an unmodulated cutting depth, designated as $D_{out}$. A more detailed flow chart of this technique is set forth in FIG. 9. As a result of the routine of block 814, a control signal representative of a new unmodulated cutting depth, $D_{out}$, is coupled to the D/A converter 161 of FIG. 4 (line 150A). The new cutter unmodulated depth is also coupled to a display 102 of console 100 (FIG. 1).

Block 815 is next entered and the land E (FIG. 7), needed to avoid echo as between adjacent grooves, is computed. This technique is described further in conjunction with a portion of the flow diagram of FIG. 10. Block 816 is then entered and the necessary pitch variation (i.e. modification of the cutter unmodulated radial position, if any, is computed and stored, as described in further detail in conjunction with the flow diagram of FIG. 10. $\Delta R$ is coupled to D/A converter 162 of FIG. 1 (line 150B) for ultimate control of the cutter lathe carriage via the electromechanical subsystem of FIG. 2. Block 817 is next entered, this block representing the computation and storage of P, which is the total unmodulated radial distance that the cutter has moved during the latest revolution of the disk 30. Since there are 200 samples per revolution, and since the cutter unmodulated radial position is modified only by $\Delta R$ control signals, a running total of P can be maintained by adding the present $\Delta R$ to the value which P had at the previous sample (designated "prev P") and subtracting the value of ΔR which had been added to P one revolution ago (i.e. 200 samples ago—and designated as "$\Delta R_{old}$"). Accordingly, P is computed as:

$$P = \text{prev}P + \Delta R - \Delta R_{old} \qquad (7)$$

During the first groove of audio, provision is made for accumulating P without subtracting $\Delta R_{old}$. The value of P can, if desired, be displayed by one of the displays 102 of the console 100 (FIG. 1). After computation of P, block 812 is reentered to repeat the procedure.

Figure 9:
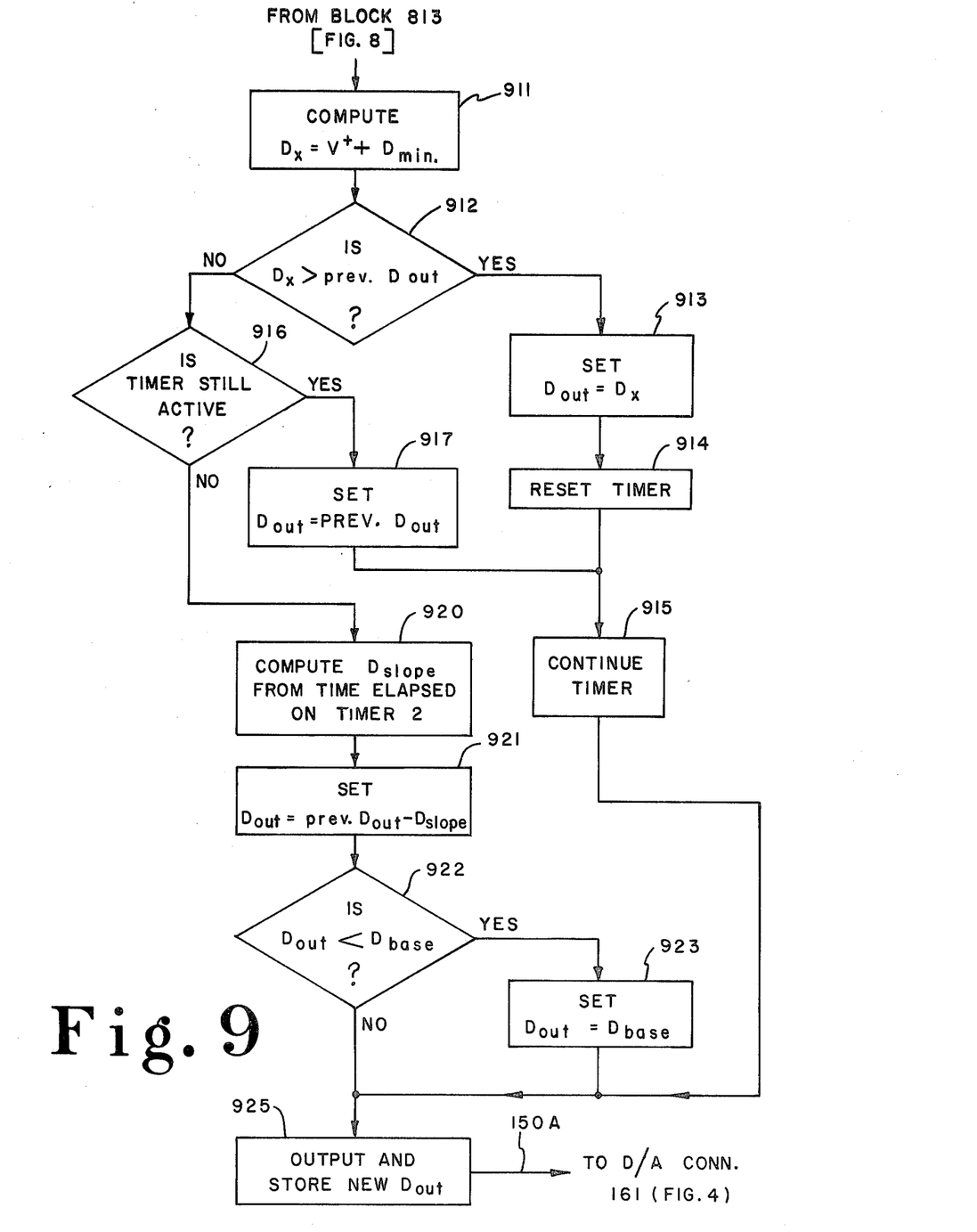
FIG. 9 is a flow chart suitable for implementing the function of the block of FIG. 8 which represents the computation and storage of an unmodulated cutter depth control signal.

Referring to FIG. 9, there is shown a flow chart suitable for implementing the function of the block 814 of FIG. 8 which represents the computation and storage of an unmodulated cutter depth control signal, $D_{out}$. Block 911 is initially entered and a value $D_x$ is computed as the sum of V+ and $D_{min}$. Decision diamond 912 is then entered and $D_x$ is tested against the previous $D_{out}$ to determine whether it is greater than the value of $D_{out}$ that was output for the previous sample (designated as prev $D_{out}$). Since $D_{min}$ is fixed, and since $D_{out}$ can never be less than $D_{base}$, an increase of $D_x$ over its value computed in conjunction with the previous sample means that V+ has increased since the last sample and the total of V+ and $D_{min}$ is greater than $D_{base}$. Thus, in accordance with the rules of relationships (1) and (2) set forth above, an increase in $D_{out}$ is needed. This is achieved by entering block 913 which represents $D_{out}$ being set equal to $D_x$. Block 914 is next entered, this block representing the resetting of a timer whose purpose will be clarified hereinbelow. Block 925 is then eventually entered, via block 915 (which merely indicates the continuance of the timer), and $D_{out}$ is output and stored. In the event that the answer to the inquiry of diamond 912 is in the negative, inquiry is next made (diamond 916) as to whether the timer is still active. In the present embodiment, the timer has an active period of 1/6 second and is used so that the output deepener control signal ($D_{out}$) is applied until such time as the unmodulated depth of the cutter reaches the depth necessary to prevent a cut that is shallower than $D_{min}$. Stated another way, since the calculations of the required unmodulated cutter depth are based upon audio which will be applied to the cutter 1/6 second later, the computed control signal is applied continuously and smoothly (via smoothing filter 163 of FIG. 4) so that the desired cutter depth is reached at the time when the modulating audio arrives at the cutter transducer. If the timer is still active, block 917 is entered and $D_{out}$ is continued at its previous value; viz., it is set at the prev $D_{out}$. Block 915 is then entered indicating that the timer is continued and block 925 is again entered indicating the outputting and storage of the new value of $D_{out}$ for the current sample processing. If the timer is not active, $D_{out}$ is set equal to prev $D_{out} - D_{slope}$, where $D_{slope}$ is a constant representing a small increment. Inquiry is then made (diamond 922) as to whether $D_{out}$ is less than $D_{base}$. If so, $D_{out}$ is set equal to $D_{base}$ (block 923). Block 925 is then entered and the value of $D_{out}$ is output and stored. If $D_{out}$ is greater than $D_{base}$, block 925 is entered directly via the "no" output branch of diamond 922, so that the value of $D_{out}$ as established by block 921 is the one stored and read out.

Operation of the flow chart of FIG. 9 can be better understood with the aid of the graph of FIG. 6. In a case where deepening is computed as being required, the control signal applied to achieve deepening (block 913—$D_{out} = D_x = V+ + D_{min}$) is ultimately applied to the solenoid 211 (FIG. 3) for a 1/6 second period so that the cutter will achieve the required unmodulated depth by the time the audio which requires same reaches the cutter transducer. This is achieved by the timer have a characteristic time of 1/6 second. Thus, for example, a sudden increase in V+ at a particular sample will result in the answer to diamond 912 being "yes", the setting of $D_{out}$ to the appropriate control signal value (block 913), and the starting of the timer (block 914). Assume that subsequent samples do not indicate a requirement for any further deepening; i.e., further increases in V+ are not encountered. In this case, diamond 916 will be entered and, since the answer to the inquiry of diamond 916 indicates that the timer is still active, the timer will merely be continued with $D_{out}$ keeping the same value which results in the unmodulated cutter depth continuing to travel toward its proper destination, as indicated by the curve of FIG. 6 (Of course, if V+ had increased, $D_{out}$ will be appropriately increased by action of block 913 and the timer will be restarted by action of block 914.) Once a deepened unmodulated cutter depth has been achieved (as indicated by the timer running out), the system operates to slowly return the cutter depth to its basic value $D_{base}$ until such time as increased audio levels operate, in accordance with the just-described blocks, to effect deepening once again. This gradual return to $D_{base}$ is achieved by successive subtraction of the small increment $D_{slope}$, this being initiated automatically at the end of the timer by operation of diamond 916 and block 921. Therefore, $D_{out}$ is gradually decreased until $D_{base}$ is reached, with diamond 922 insuring that $D_{out}$ never becomes less than $D_{base}$. Thus it is seen that the flow chart of FIG. 9 achieves implementation of cutter depth modifications as illustrated by FIG. 6. The slope, as determined by $D_{slope}$, can be any desired value, but preferably results in the gradual return of the cutter depth to $D_{base}$ taking a number of times longer than the 1/6 second in which the deepening modifications were originally implemented.

Figure 10:
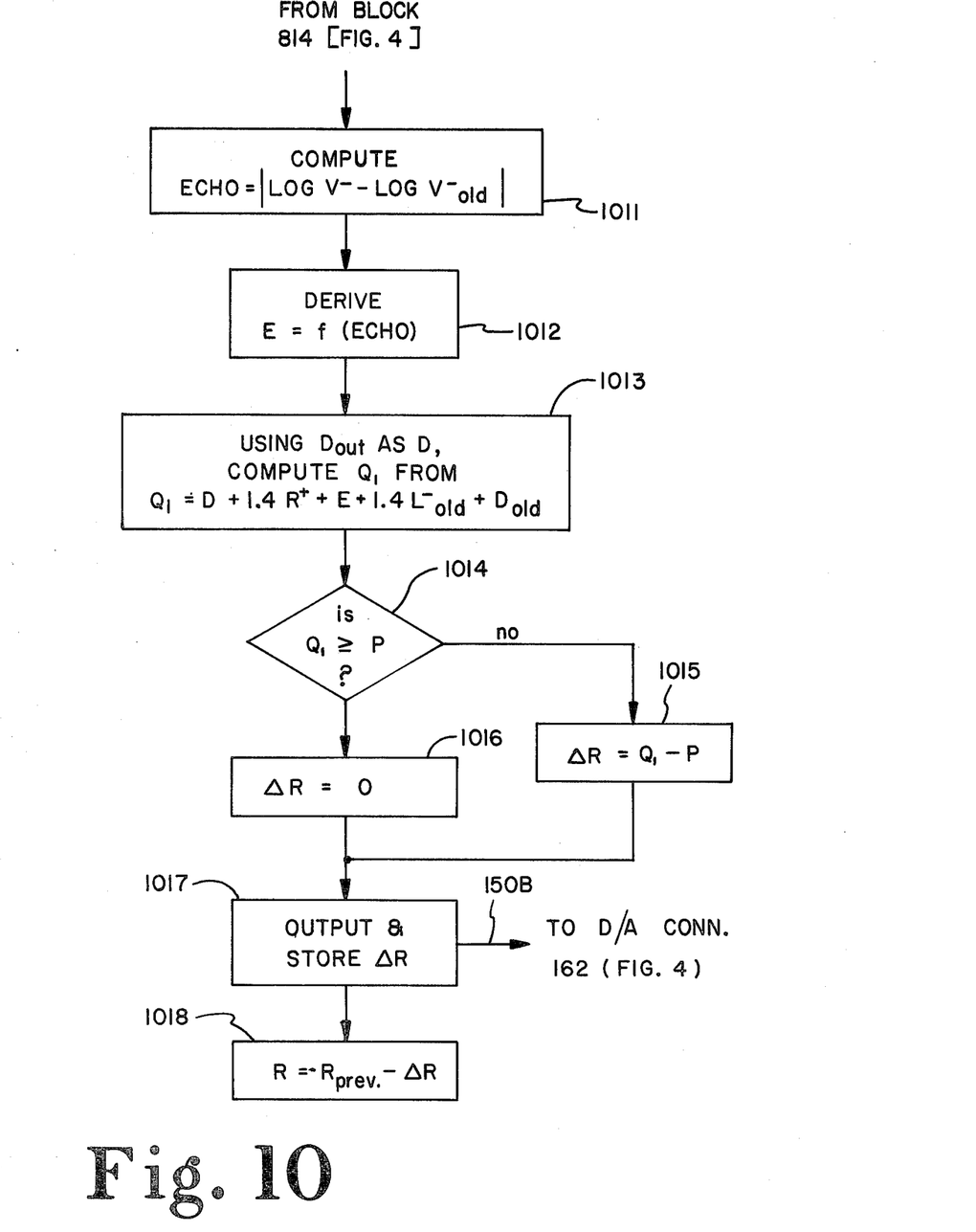
FIG. 10 is a flow chart suitable for implementing the functions represented by the blocks 815 and 816 of FIG. 8.

Referring to FIG. 10, there is shown a flow chart suitable for implementing the functions represented by the blocks 815 and 816 of FIG. 8. The block 1011 is initially entered and the degree of potential echo as between adjacent grooves is determined as the absolute value of the difference between the log of V− and the log of $V_{old}^-$. This is the relationship (5) set forth above. The block 1012 is then entered and E, i.e. the computed "land" to be employed in suppressing echo, is derived in accordance with the relationship (6). The block 1013 is next entered, and the distance $Q_1$ is computed in accordance with relationship (3), using the just-computed E and using, as D, the value of $D_{out}$ just computed in conjunction with FIG. 9. Diamond 1014 is then entered and $Q_1$ is tested against P to see if an unmodulated radial position adjustment is necessary. If so, ΔR is set equal to $Q_1 - P$, in accordance with relationship (4), as indicated by the block 1015. If no pitch increase is necessary, however, block 1016 is entered and ΔR is set equal to zero. Block 1017 is then entered and the value of ΔR is output and stored. The new total radius from the center of the disk, R, can also be updated (block 1018).

The invention has been described with reference to a particular preferred embodiment, but variations within the spirit and scope of the invention will occur to those skilled in the art. For example, since the radial position of the cutter is continuously and precisely monitored, provision can be made for comparing the final radial position (at the end of a particular audio track being recorded on the disk side) of the cutter with a reference position that defines the maximum usable annulus on the disk. If a significant portion of the allowable annulus was not used, appropriate loudness adjustment increase can be effected, and the disk recut. The same audio track will then be recorded on the allowable annulus with an enhanced time-loudness product.

We claim:

1. For use in conjunction with an audio recording apparatus which receives audio signals and forms spiral grooves in a recording disc, said apparatus including means for rotating the recording disc, a cutter for cutting grooves in the disc, cutter transducer means for modulating the instantaneous position of the cutter as a function of the audio signals, and an electromechanical subsystem responsive to control signals for directing the unmodulated radial position of the cutter; a system for generating control signals which control operation of the electromechanical subsystem, comprising:

means for sampling audio signals to be recorded;
means for storing the sample values;
means for determining and storing the current relative unmodulated radial position of the cutter;
means responsive to current sample values, the current relative unmodulated radial position of the cutter, and to prior sample values stored when the disc was at the same azimuthal position during cutting of the previous groove, for computing a computed relative unmodulated radial position of the cutter necessary to avoid overcutting into the previous groove; and
means responsive to the current relative unmodulated radial position of the cutter and the computed relative unmodulated radial position of the cutter for generating control signals to modify the unmodulated radial position of the cutter only when the current relative unmodulated radial position of the cutter is insufficient to avoid overcutting.

2. The system as defined by claim 1 further comprising means responsive to current sample values and to prior sample values stored when the disc was at the same azimuthal position during cutting of the previous groove, for computing the radial land distance between grooves necessary to suppress echo as between the adjacent grooves, and wherein said means for computing the computed relative unmodulated radial position of the cutter is also responsive to said radial land distance.

3. The system as defined by claim 1 wherein said audio signals which modulate the cutter transducer are delayed by a predetermined time with respect to current sample values, whereby time is provided for said control signals to effect responses by said electromechanical subsystem in advance of cutter unmodulated position modifications necessitated by said audio signals which modulate the cutter transducer.

4. The system as defined by claim 3 wherein said control signals are applied to said electromechanical subsystem via at least one smoothing filter which prevents distortion-introducing abrupt changes of the cutter unmodulated position.

5. The system as defined by claim 1 wherein said electromechanical subsystem is responsive to further control signals for directing the unmodulated depth of the cutter, and wherein said system further comprises:

means for determining and storing the unmodulated depth of the cutter;
means responsive to current sample values and to the current cutter unmodulated depth for computing the cutter unmodulated depth necessary to avoid a groove depth which is shallower than a predetermined minimum groove depth; and
means responsive to the current unmodulated cutter depth and the computed necessary unmodulated cutter depth for generating control signals to modify the unmodulated depth of the cutter when its current unmodulated depth is insufficient to avoid cutting a groove which is too shallow.

6. The system as defined by claim 5, wherein said audio signals which modulate the cutter transducer are delayed by a predetermined time with respect to current sample values, whereby time is provided for said control signals to effect responses by said electromechanical subsystem in advance of cutter unmodulated position modifications necessitated by said audio signals which modulate the cutter transducer.

7. The system as defined by claim 6 further comprising means responsive to current sample values and to prior sample values stored when the disc was at the same azimuthal position during cutting of the previous groove, for computing the radial land distance between grooves necessary to suppress echo as between the adjacent grooves, and wherein said means for computing the computed relative unmodulated radial position of the cutter is also responsive to said radial land distance.

8. The system as defined by claim 1 wherein said means for determining and storing the current relative unmodulated radial position of the cutter comprises means for computing and storing the sum of the modifications of the cutter unmodulated radial position effected during the latest rotation of said disc.

9. The system as defined by claim 8 further comprising means responsive to current sample values and to prior sample values stored when the disc was at the same azimuthal position during cutting of the previous groove, for computing the radial land distance between grooves necessary to suppress echo as between the adjacent grooves, and wherein said means for computing the computed relative unmodulated radial position of the cutter is also responsive to said radial land distance.

10. The system as defined by claim 8 wherein said audio signals which modulate the cutter transducer are delayed by a predetermined time with respect to current sample values, whereby time is provided for said control signals to effect responses by said electromechanical subsystem in advance of cutter unmodulated position modifications necessitated by said audio signals which modulate the cutter transducer.

11. The system as defined by claim 10 wherein said control signals are applied to said electromechanical subsystem via at least one smoothing filter which prevents distortion-introducing abrupt changes of the cutter unmodulated position.

12. The system as defined by claim 8 wherein said electromechanical subsystem is responsive to further control signals for directing the unmodulated depth of the cutter, and wherein said system further comprises:

means for determining and storing the unmodulated depth of the cutter;
means responsive to current sample values and to the current cutter unmodulated depth for computing the cutter unmodulated depth necessary to avoid a groove depth which is shallower than a predetermined minimum groove depth; and means responsive to the current unmodulated cutter depth and the computed necessary unmodulated cutter depth for generating control signals to modify the unmodulated depth of the cutter when its current unmodulated depth is insufficient to avoid cutting a groove which is too shallow.

13. The system as defined by claim 12 wherein said audio signals which modulate the cutter transducer are delayed by a predetermined time with respect to current sample values, whereby time is provided for said control signals to effect responses by said electromechanical subsystem in advance of cutter unmodulated position modifications necessitated by said audio signals which modulate the cutter transducer.

14. The system as defined by claim 13 further comprising means responsive to current sample values and to prior sample values stored when the disc was at the same azimuthal position during cutting of the previous groove, for computing the radial land distance between grooves necessary to suppress echo as between the adjacent grooves, and wherein said means for computing the computed relative unmodulated radial position of the cutter is also responsive to said radial land distance.

15. An audio recording apparatus which receives audio signals and forms spiral grooves in a recording disc, comprising:

means for rotating the recording disc;
a cutter for cutting grooves in the disc;
cutter transducer means for modulating the instantaneous position of the cutter as a function of the audio signals;
an electromechanical subsystem responsive to control signals for directing the unmodulated radial position of the cutter;
means for sampling audio signals to be recorded;
means for storing the sample values;
means for determining and storing the current relative unmodulated radial position of the cutter;
means responsive to current sample values, the current relative unmodulated radial position of the cutter, and to prior sample values stored when the disc was at the same azimuthal position during cutting of the previous groove, for computing a computed relative unmodulated radial position of the cutter necessary to avoid overcutting into the previous groove; and
means responsive to the current relative unmodulated radial position of the cutter and the computed relative unmodulated radial position of the cutter for generating control signals which are coupled to the electromechanical subsystem to modify the unmodulated radial position of the cutter only when the current relative unmodulated radial position of the cutter is insufficient to avoid overcutting.

16. Apparatus as defined by claim 15 wherein said electromechanical subsystem is responsive to further control signals for directing the unmodulated depth of the cutter, and further comprising:

means for determining and storing the unmodulated depth of the cutter;
means responsive to current sample values and to the current cutter unmodulated depth for computing the cutter unmodulated depth necessary to avoid a groove depth which is shallower than a predetermined minimum groove depth; and
means responsive to the current unmodulated cutter depth and the computed necessary unmodulated cutter depth for generating control signals to modify the unmodulated depth of the cutter when its current unmodulated depth is insufficient to avoid cutting a groove which is too shallow.

17. Apparatus as defined by claim 16 wherein said audio signals which modulate the cutter transducer are delayed by a predetermined time with respect to current sample values, whereby time is provided for said control signals to effect responses by said electromechanical subsystem in advance of cutter unmodulated position modifications necessitated by said audio signals which modulate the cutter transducer.

18. Apparatus as defined by claim 17 wherein said control signals are applied to said electromechanical subsystem via smoothing filters which prevents distortion-introducing abrupt changes of the cutter unmodulated position.

19. Apparatus as defined by claim 15 wherein said means for determining and storing the current relative unmodulated radial position of the cutter comprises means for computing and storing the sum of the modifications of the cutter unmodulated radial position effected during the latest rotation of said disc.

20. Apparatus as defined by claim 19 wherein said electromechanical subsystem is responsive to further control signals for directing the unmodulated depth of the cutter, and further comprising:

means for determining and storing the unmodulated depth of the cutter;
means responsive to current sample values and to the current cutter unmodulated depth for computing the cutter unmodulated depth necessary to avoid a groove depth which is shallower than a predetermined minimum groove depth; and
means responsive to the current unmodulated cutter depth and the computed necessary unmodulated cutter depth for generating control signals to modify the unmodulated depth of the cutter when its current unmodulated depth is insufficient to avoid cutting a groove which is too shallow.

21. Apparatus as defined by claim 20 wherein said audio signals which modulate the cutter transducer are delayed by a predetermined time with respect to current sample values, whereby time is provided for said control signals to effect responses by said electromechanical subsystem in advance of cutter unmodulated position modifications necessitated by said audio signals which modulate the cutter transducer.

22. Apparatus as defined by claim 21 wherein said control signals are applied to said electromechanical subsystem via smoothing filters which prevents distortion-introducing abrupt changes of the cutter unmodulated position.

23. For use in conjunction with an audio recording apparatus which receives audio signals and forms spiral grooves in a recording disc, said apparatus including means for rotating the recordig disc, a cutter for cutting grooves in the disc, cutter transducer means for modulating the instantaneous position of the cutter as a function of the audio signals, and an electromechanical subsystem responsive to control signals for directing the unmodulated radial position of the cutter; a method for generating control signals which control operation of the electromechanical subsystem, comprising the steps of:

sampling audio signals to be recorded;

storing the sample values;

determining and storing the current relative unmodulated radial position of the cutter;

computing a computed relative unmodulated radial position of the cutter necessary to avoid overcutting into the previous groove as a function of current sample values, the current relative unmodulated radial position of the cutter, and prior sample values stored when the disc was at the same azimuthal position during cutting of the previous groove; and generating control signals, as a function of the current relative unmodulated radial position of the cutter and the computed relative unmodulated radial position of the cutter, to modify the unmodulated radial position of the cutter only when the current relative unmodulated radial position of the cutter is insufficient to avoid overcutting.

24. The method as defined by claim 23 wherein said electromechanical subsystem is responsive to further control signals for directing the unmodulated depth of the cutter, and further comprising the steps of:

determining and storing the unmodulated depth of the cutter;

computing, as a function of sample values of audio signals to be recorded and of the current unmodulated cutter depth, the cutter unmodulated depth necessary to avoid a groove depth which is shallower than a predetermined minimum groove depth; and generating, as a function of the current unmodulated cutter depth and the computed necessary unmodulated cutter depth, control signals to modify the depth of the cutter when its current position is insufficient to avoid cutting a groove which is too shallow.

25. The method as defined by claim 24 further comprising the step of delaying, by a predetermined time, the audio signals which modulate the cutter transducer, whereby time is provided for said control signals to implement responses by said electromechanical subsystem in advance of cutter unmodulated position modifications necessitated by said audio signals which modulate the cutter transducer.

26. The method as defined by claim 23 wherein said step of determining and storing the current relative unmodulated radial position of the cutter comprises computing and storing the sum of the modifications of the cutter unmodulated radial position effected during the latest rotation of said disc.

27. The method as defined by claim 26 wherein said electromechanical subsystem is responsive to further control signals for directing the unmodulated depth of the cutter, and further comprising the steps of:

determining and storing the unmodulated depth of the cutter;

computing, as a function of sample values of audio signals to be recorded and of the current unmodulated cutter depth, the cutter unmodulated depth necessary to avoid a groove depth which is shallower than a predetermined minimum groove depth; and generating, as a function of the current unmodulated cutter depth and the computed necessary unmodulated cutter depth, control signals to modify the depth of the cutter when its current position is insufficient to avoid cutting a groove which is too shallow.

28. The method as defined by claim 27 further comprising the step of delaying, by a predetermined time, the audio signals which modulate the cutter transducer, whereby time is provided for said control signals to implement responses by said electromechanical subsystem in advance of cutter unmodulated position modifications necessitated by said audio signals which modulate the cutter transducer.

29. The method as defined by claim 28 wherein said sample values are stored and processed as digital signals.

* * * * *

UNITED STATES PATENT AND TRADEMARK OFFICE
CERTIFICATE OF CORRECTION

PATENT NO. : 4,157,460
DATED : June 5, 1979
INVENTOR(S) : Louis J. Bottali, Robert A. Finger, and Daniel W. Gravereaux It is certified that error appears in the above-identified patent and that said Letters Patent are hereby corrected as shown below:

Col. 2, line 9, change "th" to --the--

Col. 4, line 22, indent after "pitch."

Col. 6, line 46, change "conveniently" to --conventionally--

Col. 8, line 39, change "$V^{30}$" to "$V+$"

Col. 10, line 4, change "junction" to --function--

Col. 10, line 25, change "leadout" to --lead out--

Col. 16, line 59, change "recordig" to --recording--

Signed and Sealed this

Twenty-fifth Day of September 1979

[SEAL]

Attest:

LUTRELLE F. PARKER

Attesting Officer      Acting Commissioner of Patents and Trademarks